May 16, 1933. M. WAGNER 1,909,242
VARIABLE SPEED TRANSMISSION GEAR
Filed July 9, 1930 3 Sheets-Sheet 3
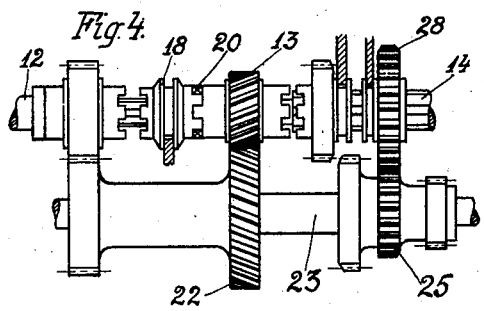
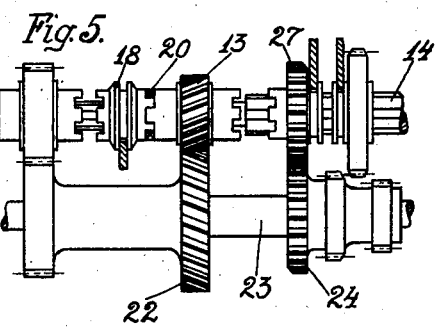
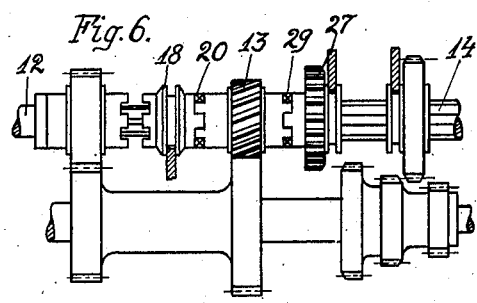
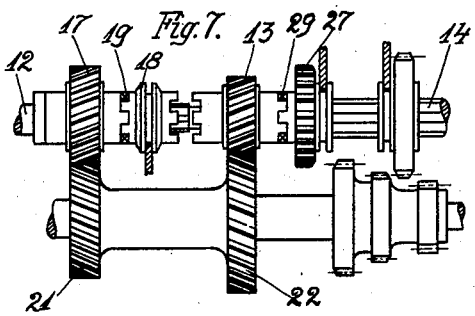
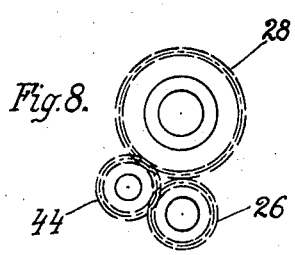
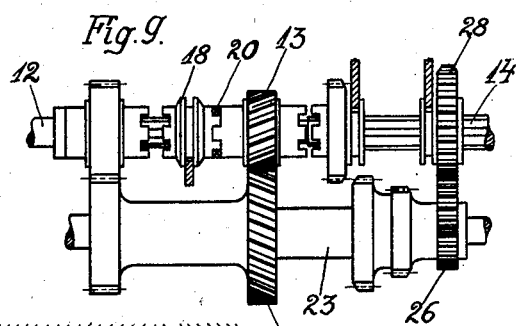
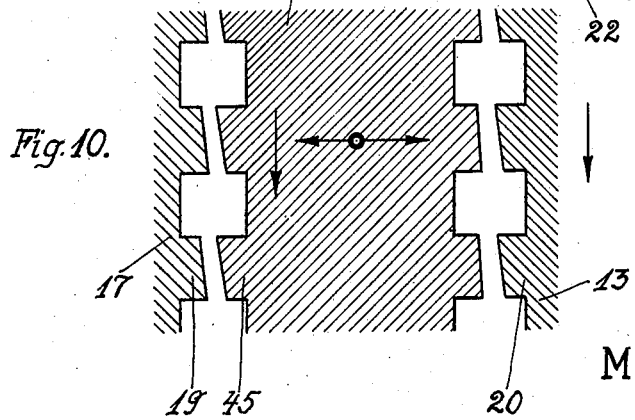
Inventor
Max Wagner
By
Attorney Patented May 16, 1933

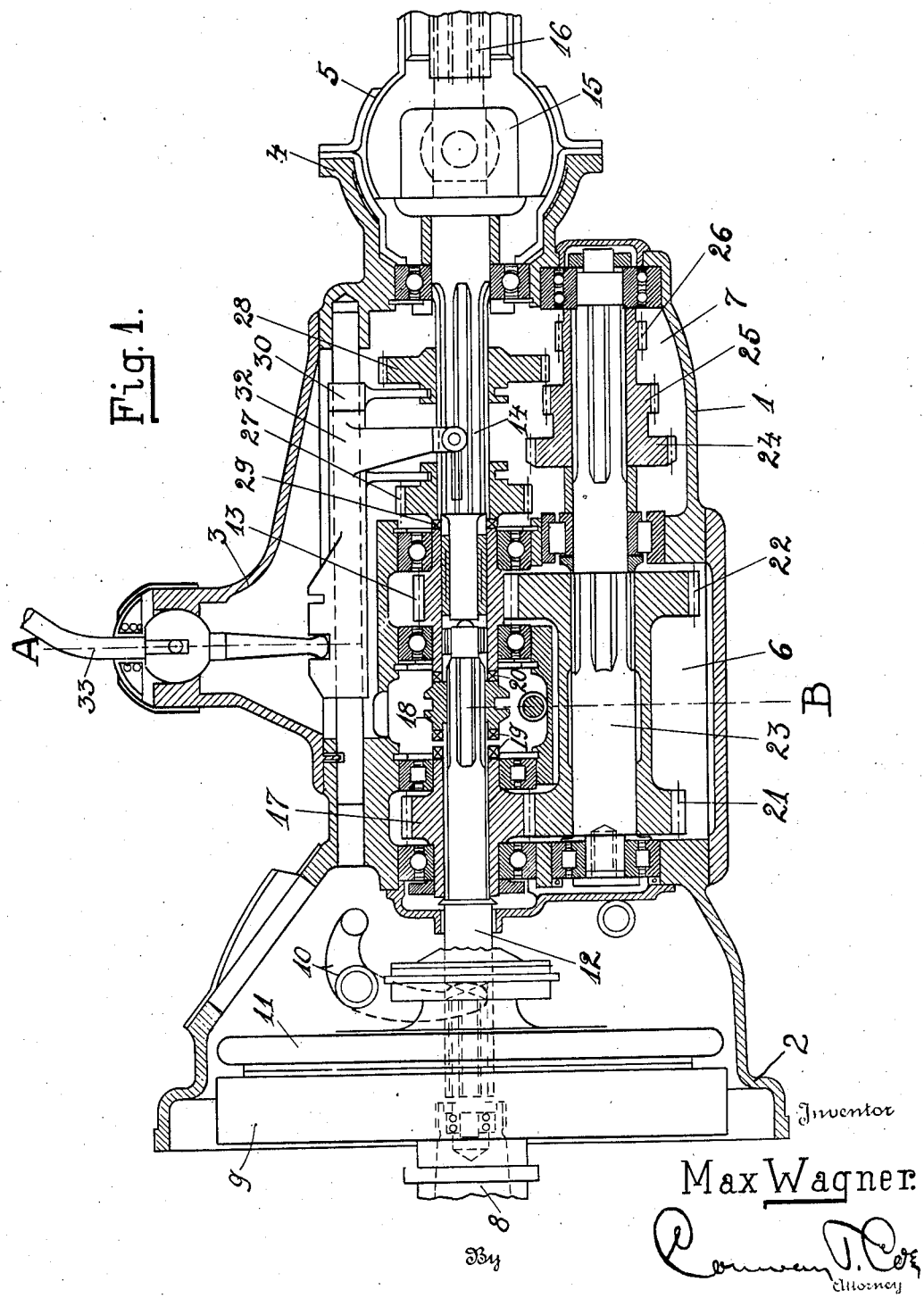

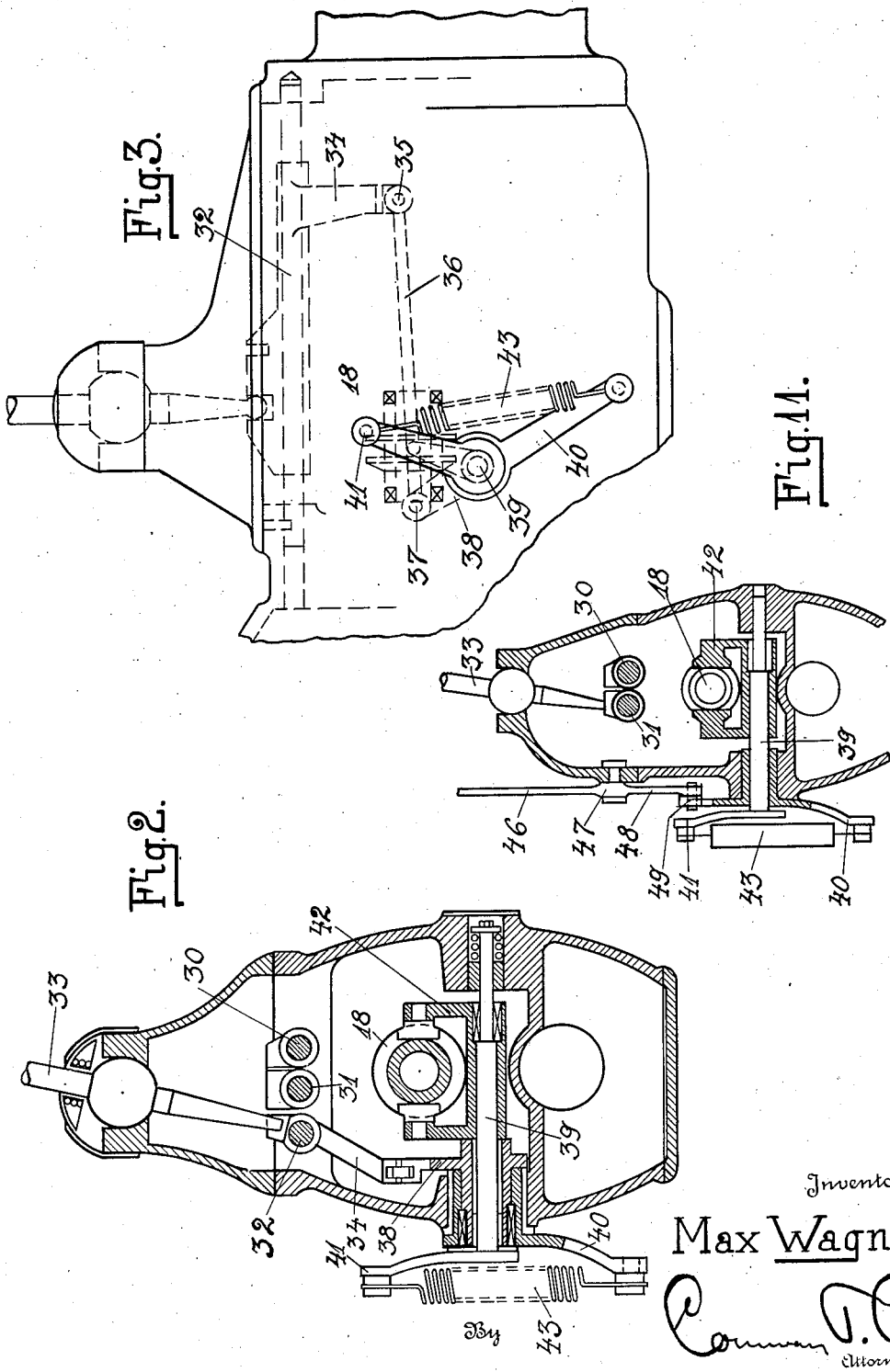

1,909,242

UNITED STATES PATENT OFFICE

MAX WAGNER, OF STUTTGART, GERMANY, ASSIGNOR TO DAIMLER-BENZ AKTIEN-GESELLSCHAFT, OF STUTTGART-UNTERTURKHEIM, GERMANY, A COMPANY OF GERMANY

VARIABLE SPEED TRANSMISSION GEAR

Application filed July 9, 1930, Serial No. 466,700, and in Germany July 12, 1929.

My invention relates to a variable speed transmission gear of the slide-gear type such as ordinarily employed in automobiles in which the gears for transmitting motion in certain speeds are in permanent mesh with each other, and the gears for transmitting motion in the rest of the speeds are adapted to be selectively brought in mesh.

More particularly, my invention relates to such transmission gears of the slide-gear type which are equipped with a high-speed gear comprising a train of gears or pinions which permit of a higher speed than does the direct gear, i. e. the direct connection of the motor-shaft with the main drive shaft.

However, my invention may likewise be applied to gears in which none of the different ratios of transmission results in a higher speed than said direct connection.

The objects of my invention are to provide a simple and rugged structure which permits the normal design of the main drive shaft and its casing tube to be retained which is not possible if an additional transmission separate from the main transmission is employed as proposed prior to my invention for obtaining the high-speed gear effect; to combine the high-speed train of gears and the train of the ordinary slide-gears so as to reduce the number of gears by at least one pair in comparison with constructions involving a separate additional transmission; to simplify the shifting mechanism and its operation.

Further objects of my invention are to provide a transmission gear including a high-speed gear train in a unitary casing which will greatly simplify the lubrication as compared with a transmission comprising two separate units; a compact structure of reduced longitudinal dimensions and a low weight; to support the main shaft of the transmission within a motion-transmitting element constituting a hollow shaft; to provide a fetch clutch which will automatically engage when its elements have attained the same speed of rotation and, therefore, dispenses with the necessity of disengaging the motor clutch in shifting the permanently engaging gears; to obtain a smooth and quiet operation of the transmission by reducing its length and, thus, arranging the bearings in close proximity to each other; to provide a two-speed train of gears in front of its selective slide-gears whereby the number of speeds is duplicated in a simple manner.

Other objects of my invention will appear from a description of a preferred embodiment of my invention following hereinafter, and the features of novelty will be pointed out in the claims.

In the accompanying drawings

Fig. 1 illustrates a longitudinal section through a transmission of the selective slide-gear type for an automobile, the parts being shifted to the third or direct speed position;

Fig. 2 is a cross-section along the off-set line A—B of Fig. 1;

Fig. 3 is an elevation of part of Fig. 1 viewed from the left with regard to Fig. 2, illustrating the high-speed shifting mechanism;

Figs. 4–7 and 9 are diagrammatic illustrations indicating the different positions for the various speeds, the motion-transmitting trains of gears being marked by a cross-hatching showing the teeth while the gears running idle are not so marked;

Fig. 8 is a diagram for the reverse gear;

Fig. 10 is a diagrammatic circumferential section through the fetch clutch; and

Fig. 11 is a section similar to Fig. 1 through a slightly modified embodiment.

Referring to Fig. 1, the transmission casing 1 has a flange 2 encasing the fly-wheel of the motor and adapted to be fitted to the housing of the same. An opening provided in the top of the transmission gear is closed by a cover 3 carrying the gear shift lever 33 by means of the customary ball joint, while the rear end of the casing has a flange 4 accommodating the housing 5 of the universal joint 15.

The interior of the casing is divided by a partition into chambers 6 and 7 of which chamber 6 encases the permanently engaging train of gears and chamber 7 the selective slide-gears.

8 is the end of the motor crank shaft carrying the fly-wheel 9 co-operating with a clutch 11 which is adapted to be actuated by the customary pedal-controlled lever 10 and is operative to clutch the crank shaft 8 to the shaft 12. The shaft 12 is journaled on the one side in the end of the crank shaft 8 within the transmission casing and, on the other side, within a hollow shaft integral with a pinion 13. The shaft carrying the pinion 13 has both ends supported in anti-friction bearings, one being mounted in the above-mentioned partition wall and the other in a suitable ear extending from the wall of the casing. The driven shaft 14 of the transmission gear is arranged in co-axial relation and adjacent to the shaft 12 and its one end projects into the shaft of gear 13 to be supported thereby, while its other end is journaled in the rear wall of the casing in a ball bearing and is connected to the universal joint 15 which, in its turn, is connected to the drive shaft 16. There is another hollow shaft integral with a pinion 17 which surrounds the shaft 12 and has likewise its ends supported in anti-friction bearings, one seated in the left end wall of the casing and the other seated in the above-mentioned gear, as will appear from Fig. 1. The hollow shafts of gears 13 and 17 are suitably spaced to accommodate between them a clutch element 18 in form of a toothed sleeve which is shiftably and non-rotatably mounted on shaft 12 to be selectively clutched by longitudinal movement with teeth 19 on the shaft of gear 17 or with teeth 20 on the shaft of gear 13.

It is to be noted that both hollow shafts are freely rotatable on shaft 12 and may be selectively clutched with the same by member 18, one at a time. The customary auxiliary shaft 23 is arranged in parallel relation to the shafts 12 and 14 and journaled in suitable anti-friction bearings provided in the end walls and the partition wall of the casing 1. Rigidly attached on this shaft 23 within the chamber 6 is a sleeve integral with gears 21 and 22 which are in permanent mesh with the pinions 17 and 13, respectively. Within the chamber 6 the auxiliary shaft 23 carries a sleeve having integral gears 25 and 26 and being likewise rigidly secured to the shaft. The gears 24, 25 and 26 co-operate with selective slide-gears 27 and 28 shiftably mounted on the shaft 14 as will be described hereinafter. The end face of the gear 27 is provided with clutch teeth 29 adapted to engage registering teeth on the end of the shaft of pinion 13.

For shifting the slide-gears 27 and 28 and the clutch member 18 into their different positions, three shifting slides 30, 31 and 32 are provided which are guided on suitable rods arranged within the upper part of the casing in parallel relation to each other and to shafts 12 and 14. These slides may be selectively engaged and actuated by the gear shift lever 33 in the customary manner. The slide 30 serves for shifting the gear 28 into or out of engagement with the gear 25 or a reversing gear 44 (Fig. 8) and, for this purpose, carries a fork engaging a suitable peripheral groove on the hub of gear 28.

Similarly, the slide 31 is adapted to shift the gear 27 in engagement with gear 24 or pinion 13. The slide 32 serves for actuating the clutch member 18 in the manner described hereinafter with reference to Figs. 2 and 3.

The slide 32 has a downwardly and laterally extending arm 34 terminating in an ear 35 to which a link 36 is pivoted. The other end of the latter is linked to the inner arm 38 of a sleeve which is journaled in the side wall of the casing 1 and has a downwardly extending arm 40 outside of the casing. It will be noted from Fig. 2 that the sleeve is composed of two tube-shaped parts which are slipped into one another from opposite sides of the wall, each of said parts carrying one of the arms 38 and 40. Through the sleeve there extends a shaft 39 transversely to and between the shafts 12 and 23 and carries at its outer end an arm 41 and, within the casing, a fork 42 engaging a suitable peripheral groove of the clutch member 18. A tension spring 43 is stretched between the arms 40 and 41. In the position illustrated in Fig. 3, these arms form a certain angle which the spring 43 tends to decrease and, thus, urges the clutch member 18 towards the right as the slide 32 and the link 36 assume their normal left-hand end position. In this position, the teeth of the clutch member 18 engage the teeth on the shaft of pinion 13, clutching shaft 12 to the latter.

If the operator shifts the slide 32 towards the right by means of the gear shift lever 33, the composite sleeve with the arms 38 and 40 is turned in clock-wise direction about the shaft 39, thus increasing the tension of spring 43 until the arm 40 forms an angle of 180° with the arm 41. Upon passage of the arm 40 through this position, the spring 43 tending to approach its points of connection pulls vigorously the arm 41 in counter-clockwise direction. Therefore, the fork 42 is actuated to disengage the clutch member 18 from the pinion 13 and to bring it in engagement with the pinion 17, the engagement and disengagement taking place automatically under the control of the spring 43 subsequently to the manual actuation of the slide 32.

The various speed positions of my transmission gear will be described hereinafter:

Fig. 4 illustrates the position in first speed. The motion is transmitted from shaft 12 through clutch member 18, teeth 20, pinion 13, gear 22, shaft 23 to gear 25 and, therefrom, through the gear 28 to the driven shaft 14.

In Fig. 5 the second speed position is shown in which the slide-gear 27 is put in engagement with the gear 24. The motion is transmitted from shaft 12 to shaft 23 in the manner just described and from shaft 23 by means of the gears 24 and 27 to the driven shaft 14.

Fig. 6 represents the position in the third or direct gear, the driven shaft 14 being directly clutched to the pinion 13 by means of the slide-gear 27 and its teeth 29. The motion is transmitted from shaft 12 through clutch member 18 and its teeth 20 to the gear 13 and, thus, to shaft 14.

Fig. 7 illustrates the high-speed gear position in which the clutch member 18 is in engagement with the gear 17. The motion is transmitted from shaft 12 through the clutch member 18 and its teeth 19 to the pinion 17 and, therefrom, through the gears 21, 22 and 13, the teeth 29 and the slide-gear 27 to shaft 14.

Figs. 8 and 9 show the reversing gear. The slide-gear 28 has been shifted to its right end position so as to mesh with a suitable gear 44 which is in permanent engagement with a gear 26. The motion is transmitted from shaft 12 to shaft 23, as explained with reference to Fig. 4, and through gears 26, 44 and 28 to shaft 14.

As a rule, the clutch member 18 is normally in engagement with the teeth 20 of pinion 13 and only for high-speed it is shifted to the left and clutched with the pinion 17.

It is well-known that it is necessary for the operator to disengage the motor clutch during the gear-shift operation, that is to say, during the displacement of the slide-gears 27 and 28 in order to avoid injury to the gears. In order to simplify the operation, I may provide the means described hereinafter in connection with the clutch member 18 whereby the latter may be shifted while the motor clutch 11 remains engaged. For this purpose, the teeth 45 of the clutch member 18 and the co-ordinated teeth of the pinions 13 and 17 are bevelled as diagrammatically shown in Fig. 10. At the time when the slide 32, with the transmission being in third gear, is moved to the right so that the spring 43 urges the clutch member 18 in direction towards the teeth 19 and out of the teeth 20, the member 18 runs faster than the pinion 17 in the direction indicated by the left arrow in Fig. 10. As the teeth 19 and 45 are bevelled or inclined as shown in Fig. 10, the clutch member 18 will first ride on the end faces of the teeth 19 and will be repelled by the same so that an engagement of the teeth will not occur until the operator has slowed down the motor sufficiently to impart to the member 18 the same rotary speed as has the pinion 17. Then, the teeth 19 and 45 are automatically brought in engagement by action of a spring 43. If the operator driving in high-speed gear (Fig. 7) desires to shift down into the third gear, he need not throw out the motor clutch but has simply to shift slide 32 to the left to thereby cause spring 43 to pull the clutch member 18 toward the pinion 13. First, the pinion 13 will run faster than the clutch member 18 and thus prevent the engagement until the operator has sufficiently accelerated the motor to give both parts the same speed.

In Fig. 11 I have shown a somewhat modified construction. The gear shift lever 33 serves to actuate the slides 30 and 31 for first, second and third and reverse speed only, while the high-speed gear is shifted independently by a special hand lever 46. The lever 46 is pivoted to the casing at point 47 intermediate its ends and its lower end 48 is suitably linked to an outer arm 49 of the sleeve carrying the arm 40.

Having thus described and shown a preferred embodiment of my invention, I shall briefly reiterate what I consider to be the spirit of my invention as defined in the appended claims:

In a common casing there is arranged a train of permanently engaging gears and, in the rear thereof viewed in the direction of travel, a train of selectively engaging gears and the main shaft is divided in a number of adjacent co-axial sections. Between the driving section and the driven section, there is inserted an intermediate member formed as a hollow shaft accommodating a portion or portions of the main shaft. The permanently engaging train of gears comprises a two-speed gear including a pinion mounted on the main shaft and constituting the aforementioned intermediate member between the driving and the driven shaft and serving to transmit motion to the secondary shaft which is common to both trains of gears. This pinion thus driving the secondary shaft serves moreover to transmit motion to the driven shaft when the transmission is shifted into high-speed.

Furthermore, the two pinions of the two-speed gear rotatably mounted on the main shaft are provided with bearings arranged in immediate proximity to the end faces of the pinions, the bearing of the one pinion being preferably located in a partition wall of the casing.

Moreover, I provide between the pinions of the high-speed train of gears a selective clutch having bevelled teeth and permitting such section of the clutch as runs slower at any time to gradually fetch up with the quicker running section until the rotary speeds of the both sections are substantially equal.

I preferably provide a common gear shift lever for all speeds of transmission. It is possible, however, to actuate the high-speed gear by a separate lever. This enables the operator to selectively shift the transmission in twice as many different speeds as the slide-gear train permits per se. This is due to the fact that both trains of gears of the two-speed gear may be selectively used as a separate transmission arranged in tandem relation to the slide-gear transmission. It will be easily appreciated that all of the objects of my invention are fully attained by the construction described heretofore.

What I claim is:—

1. In a transmission gearing for automobiles, a main shaft comprising a hollow central section and driving and driven end sections having their adjacent ends journalled within said hollow section, an auxiliary shaft parallel to said main shaft, a gear rigidly mounted on said hollow section, bearings supporting said hollow section on either side of said gear, a second gear rotatably mounted on one of said end sections, gears rigidly mounted on said auxiliary shaft and permanently engaged with said first and second gears, the adjacent faces of said hollow section and said second gear having inclined clutched teeth thereon, a clutch element having inclined teeth on both sides thereof slidably and non-rotatably mounted on said first end section between said hollow section and said second gear, means for shifting said clutch member to engage said hollow section on said second gear, said means including snap-action means to prevent retainment of said clutch member in an intermediate disengaged position, a gear on the second of said end sections and a gear on said auxiliary shaft engageable with said last named gear.

2. In a transmission gearing for automobiles, a main shaft comprising a hollow central section and driving and driven end sections having their adjacent ends journalled within said hollow section, an auxiliary shaft parallel to said main shaft, a gear rigidly mounted on said hollow section, a second gear rotatably mounted on one of said end sections, gears rigidly mounted on said auxiliary shaft and permanently engaged with said first and second gears, the adjacent faces of said hollow section and said second gear having inclined clutch teeth thereon, a clutch element having inclined teeth on both sides thereof slidably and non-rotatably mounted on said first end section between said hollow section and said second gear, means for shifting said clutch member to engage said hollow section on said second gear, said means including snap-action means to prevent retainment of said clutch member in an intermediate disengaged position, a pair of gears of different size fixed on said auxiliary shaft opposite the second of said end sections, a pair of gears on said second end section movable to engage said last named gears, the mating faces of one of said last gears on said second end section and said hollow section having cooperating clutch teeth thereon, and means to shift said last gears whereby movement only of said last gear having clutch teeth thereon changes from second to third speed while movement of said clutch member changes from third to fourth speed.

3. In a transmission gearing for automobiles, a main shaft comprising a hollow central section and driving and driven end sections having their adjacent ends journalled within said hollow section, an auxiliary shaft parallel to said main shaft, a gear rigidly mounted on said hollow section, a second gear rotatably mounted on one of said end sections, gears rigidly mounted on said auxiliary shaft and permanently engaged with said first and second gears, the adjacent faces of said hollow section and said second gear having inclined clutch teeth thereon, a clutch element having inclined teeth on both sides thereof slidably and non-rotatably mounted on said first end section between said hollow section and said second gear, means for shifting said clutch member to engage said hollow section or said second gear, said means including snap-action means to prevent retainment of said clutch member in an intermediate disengaged position, a pair of gears of different size fixed on said auxiliary shaft opposite the second of said end sections, and a pair of gears on said second end section movable to engage said last named gears, movable means for coupling said second end section to said hollow section, and means to shift said coupling means whereby movement of said coupling means changes from a lower speed to the second highest speed while movement of said clutch member changes from second highest speed to highest speed.

4. In a transmission gearing for automobiles, a main shaft comprising a hollow central section and driving and driven end sections having their adjacent ends journalled within said hollow section, an auxiliary shaft parallel to said main shaft, a gear rigidly mounted on said hollow section, a second gear rotatably mounted on one of said end sections, gears rigidly mounted on said auxiliary shaft and permanently engaged with said first and second gears, the adjacent faces of said hollow section and said second gear having inclined clutch teeth thereon, a clutch element having inclined teeth on both sides thereof slidably and non-rotatably mounted on said first end section between said hollow section and said second gear, means for shifting said clutch member to engage said hollow section or said second gear, said means including snap-action means to prevent retainment of said clutch member in an intermediate disengaged position, a pair of gears of different size fixed on said auxiliary shaft opposite the second of said end sections, and a pair of gears on said second end section movable to engage said last named gears, movable means for coupling said second end section to said hollow section, and means to shift said coupling means whereby movement of said coupling means changes from a lower speed to the second highest speed while movement of said clutch member changes from second highest speed to highest speed, said first gear being smaller than said second gear.

In testimony whereof I affix my signature.

MAX WAGNER.